United States Patent [19]

McGrew et al.

[11] Patent Number: 4,557,759

[45] Date of Patent: Dec. 10, 1985

[54] IODINE LEACH FOR THE DISSOLUTION OF GOLD

[75] Inventors: Kent J. McGrew; Jack W. Murphy, both of Laramie, Wyo.

[73] Assignee: In-Situ, Inc., Laramie, Wyo.

[21] Appl. No.: 598,706

[22] Filed: Apr. 10, 1984

[51] Int. Cl.$^4$ ............................................. C22B 11/04
[52] U.S. Cl. .............................. 75/118 R; 75/101 R; 75/108; 423/38; 423/39; 423/42; 423/46; 204/111
[58] Field of Search ............ 204/111; 75/118 R, 108, 75/121, 101 R; 423/38, 42, 39, 46; 156/654, 187 R; 252/79 R

[56] References Cited

U.S. PATENT DOCUMENTS

| | | | |
|---|---|---|---|
| 2,304,823 | 12/1942 | Harrison | 75/118 |
| 3,495,976 | 2/1970 | Bazilevsky et al. | 75/101 |
| 3,625,674 | 4/1969 | Jacobs | 75/101 |
| 3,772,003 | 11/1973 | Gordy | 204/111 |
| 3,778,252 | 12/1973 | Wilson | 75/101 R |
| 3,826,750 | 7/1974 | Wilson | 252/187 R |
| 3,957,505 | 5/1976 | Homick et al. | 75/108 |
| 3,957,603 | 5/1976 | Rhodes | 204/111 |
| 4,131,454 | 12/1978 | Piret et al. | 75/118 R |
| 4,190,489 | 2/1980 | Bahl et al. | 156/664 |
| 4,319,923 | 3/1982 | Falanga et al. | 75/108 |
| 4,375,984 | 3/1983 | Bahl et al. | 75/97 A |

Primary Examiner—John Doll
Assistant Examiner—Robert L. Stoll
Attorney, Agent, or Firm—Sheridan, Ross & McIntosh

[57] ABSTRACT

A process for the hydrometallurgical recovery of gold from materials containing gold comprising leaching the materials with a lixiviant containing iodine. To a solution concentrated with natural salts is added elemental iodine until saturated, whereupon mineral sulfides in the ore zone charged with this solution react with the iodine to form iodide. Additional elemental iodine is then added to this iodide-bearing solution until the desired concentration of total iodine and ratio of iodine to iodide are achieved for optimum leaching. The lixiviant is then circulated through the ore zone until all the gold is dissolved. Gold is subsequently recovered on activated charcoal. The excess iodide formed during the process is reoxidized to iodine electrochemically in a special diaphragm cell to regenerate the lixiviant.

14 Claims, 2 Drawing Figures

ANODE REACTION: $3I^- \rightarrow I_3^- + 2e^-$
CATHODE REACTION: $2e^- + 2H_2O \rightarrow H_2 + 2OH^-$
NET REACTION: $2H_2O + 3I^- \rightarrow I_3^- + H_2 + 2OH^-$

IODINE LEACH FOR THE DISSOLUTION OF GOLD

TECHNICAL FIELD

This invention lies in the field of hydrometallurgy. In particular, it involves the recovery of gold by in-situ, heap leach, and agitated leach processes.

BACKGROUND OF THE INVENTION

In most hydrometallurgical processes for the recovery of gold, elemental gold is solubilized by oxidation to ionic gold and complexation with cyanide. While the use of cyanide for gold recovery systems has been the primary process for the recovery of gold for many decades, the toxicity of cyanide makes introduction into groundwaters associated with gold ores highly undesirable. Apart from the toxicity of cyanide to man, its use poses long-term environmental and waste disposal problems.

Consequently, the use of iodide as a complexing agent in the gold recovery process carries with it significant benefits. Direct benefits are derived from the lack of immediate pollution of the leach area with a highly toxic material, such as cyanide. In addition, the reduced requirements of containment and disposal of leach waste materials are highly economic. This is particularly true of in-situ leach processes where such factors are of great concern in determining the economic feasibility of gold recovery.

While iodine leach processes are well known in the art, a significant problem with prior methods is that they suffer from inefficient recovery and reuse of iodine. Much of the iodine is consumed by the ore body. Since iodine is only 300 times more abundant than gold itself, this relative scarcity can make the use of iodine too expensive for commercially economic recovery of gold via in-situ leaching processes.

Another problem with these processes concerns the solubility of iodine in a typical aqueous system. Alkali metal cations, such as sodium and potassium, generally must be added to promote dissolution. This addition of foreign cations generates a substantial portion of the cost associated with waste handling and restoration of the mining area, and is therefore undesirable.

Finally, while some gold recovery methods allowing the use of iodine employ reoxidation of the iodine in order to conserve the iodine for reuse, these methods typically require the introduction of oxidizing anions such as chlorine. This is also undesirable for both the ecological and economic reasons discussed above with respect to the addition of cations.

The inventor's process overcomes these problems with prior known methods. The instant process comprises a practical mining technique for the recovery of gold from permeable gold ores which does not require the introduction or use of toxic species such as cyanide. Moreover, the method allows the use of iodine in the leach process without the addition of cations into the lixiviant in order to promote dissolution of iodine during its introduction into the leach. Finally, the process permits reoxidation of the iodide to iodine, thus conserving the starting material, without the introduction of oxidizing anions, such as those of chlorine, chlorate, or hypochlorite. Thus the costs associated with environmental clean up of toxic materials, and with the exhaustion and consumption of scarce iodine are greatly mitigated.

SUMMARY OF THE INVENTION

Figure 1:
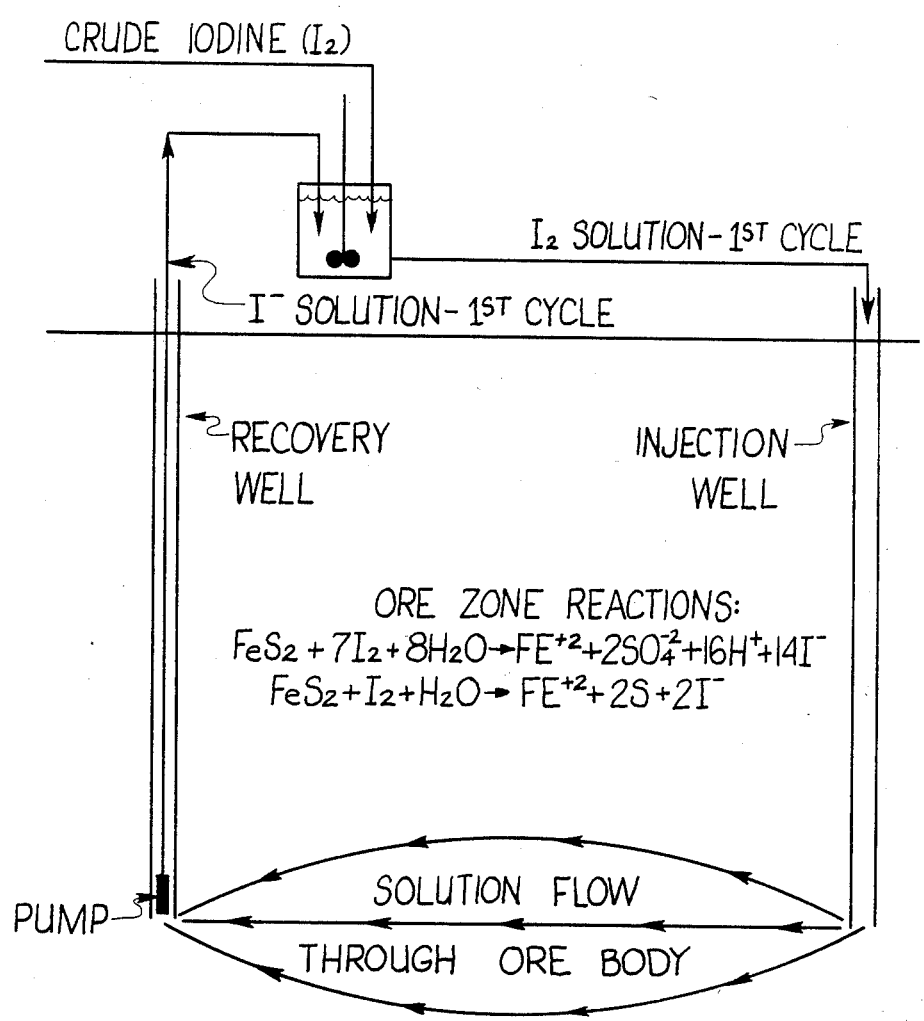
FIG. 1 is a flowchart showing a preferred embodiment of the process of this invention.

Gold is recovered from gold bearing materials, particularly gold ores, by oxidation with iodine and complexation with iodide in an aqueous, electrically conductive lixiviant. The oxidation of sulfide minerals or other iodine reducing species in the ore zone contacted by the iodine-bearing lixiviant yields iodide as a reaction product. On subsequent addition of more iodine to the lixiviant, iodine is complexed by iodide and is dissolved until the desired concentration of iodine is achieved. Thus no alkali cations need be added to the lixiviant. To maintain the desired ratio of iodide to iodine complex (tri-iodide), the lixiviant is subjected to an oxidation process. In a preferred embodiment, the lixiviant is passed through a special diaphragm cell where iodide is electrochemically re-oxidized to form the iodine complex. Preferably, this method relies on the presence of common groundwater salts (e.g., NaCl, NaHCO$_3$, Na$_2$SO$_4$, etc.) to render the lixiviant electrically conductive as it passes through the diaphragm cell. Gold recovery from the withdrawn lixiviant is preferably by means, such as activated charcoal, which do not affect the iodine rich lixiviant's ability to oxidize, complex, and dissolve the gold. Gold recovery is also possible by loading on suitable resins, cementation, and the like.

The use of iodine in the lixiviant obviates the need to use toxic materials such as cyanide in the gold leach process. Gold oxidation, complexation and dissolution are rapid, and effective recovery of the gold at acceptable leach rates is possible.

The use of electrochemical oxidation for regeneration of iodine complex from iodide in solution obviates the need for reintroduction of significant additional amounts of scarce elemental iodine.

The process of this invention herein described can be used for in-situ leaching, or for heap, or agitated leaching with additional modifications.

DESCRIPTION OF THE PREFERRED EMBODIMENT

The solubilization and recovery of gold requires that the gold be oxidized from its native or elemental form to an ionic state. All of the halogen group of elements, i.e. fluorine, chlorine, bromine, and iodine, readily oxidize gold. Once oxidized, ionic gold is stabilized in solution (solubilized) by complexation with a complexation agent. Chlorine, bromine, and iodine form stable Au(I) or Au(III) complexes in aqueous solutions with the respective reduced species of the element (e.g., AuCl$_2^-$, AuCl$_4^-$). Gold dissolution may occur in an aqueous iodine/iodide system according to the following equations:

$$2Au + I^- + I_3^- \rightarrow 2AuI_2^- \tag{1}$$

$$2Au + 3I_3^- \rightarrow 2AuI_4^- + I^- \tag{2}$$

Neither equation 1 or 2 is favorable at standard potentials. However, standard conditions rarely prevail in real systems. Moreover, for a given weight/volume concentration of total iodine (where "total iodine" is defined as all species of iodine in solution, e.g. $I^-$, $I_2.I^-$, $I_2$, etc.), by varying the distribution of iodide, tri-iodide, and iodine, it is possible to bring about a net spontaneous reaction for the oxidation and complexation of gold.

In the preferred embodiment of the process, elemental iodine is added to a solution to form a gold lixiviant or leach. The solubility of the iodine will be limited initially to about 0.3 g/l (elemental $I_2$). However, generally a higher total iodine concentration is desirable for economic application of the process. The process may be conducted with a concentration of total iodine on the order of between about 0.3 g/l and the upper solubility limit of total iodine in the system, preferably between about 1 and about 20 g/l, more preferably between about 2 g/l and about 5 g/l, and most preferably about 3 g/l.

It is possible to achieve this higher concentration of iodine ($I_2$) by reacting it in solution with sulfide minerals in the ore body, such as marcasite ($FeS_2$), chalcopyrite, chalcocite, covellite, galena, pyrite, and the like, to create iodide ($I^-$) by the following reactions:

$$FeS_2 + 7I_2 + 8H_2O \rightarrow Fe^{+2} + 2(SO_4)^= + 16H^+ + 14I^- \qquad (3)$$

$$FeS_2 + I_2 \rightarrow Fe^{+2} + 2S + 2I^- \qquad (4)$$

To ensure sufficient iodide formation, the ore body being mined must contain some sulfide minerals, or other iodine-reducing species. However, the absence of such minerals or species is extremely rare. The presence of $I^-$ ("reduced iodine") in the spent lixiviant greatly increases the solubility of $I_2$ ("oxidized iodine") subsequently added to the lixiviant. By circulating the lixiviant through the ore zone, returning it to the surface, and subsequently adding more iodine, iodine is dissolved by the formation of the tri-iodide complex ($I_2.I^-$ or $I_3^-$) according to the reaction:

$$I_2 + I^- \rightarrow I_2.I^- \qquad (5)$$

It is possible by repetition of this step, which is illustrated in FIG. 1, to approximately double the total iodine concentration of the lixiviant with each iodine addition until the desired concentration, preferably about 3.0 g/l has been achieved. The ratio of "reduced iodine" ($I^-$) to "oxidized iodine" ($I_2$) on a weight basis in the lixiviant is limited only by the solubility of such species in the solution, but is preferably between about 10 to 1 and about 1 to 10, and more preferably about 2 to 1 (i.e. 2 g/l $I^-$: 1 g/l $I_2$). For economic reasons, this ratio of 2 to 1 is very desirable, but practice of the inventor's process is obviously not limited to this specific ratio.

Once the iodine concentration has been raised to the desired level, the lixiviant is circulated through the ore body as many times as necessary to effect complete recovery of the gold. The actual recovery of gold from the lixiviant, once withdrawn, can be carried out by means such as activated charcoal, or by other means previously mentioned or known to the art, without requiring any further addition or treatment of the iodine in solution. On completion of gold recovery, the lixiviant may be advanced to the next zone to be mined.

Figure 2:
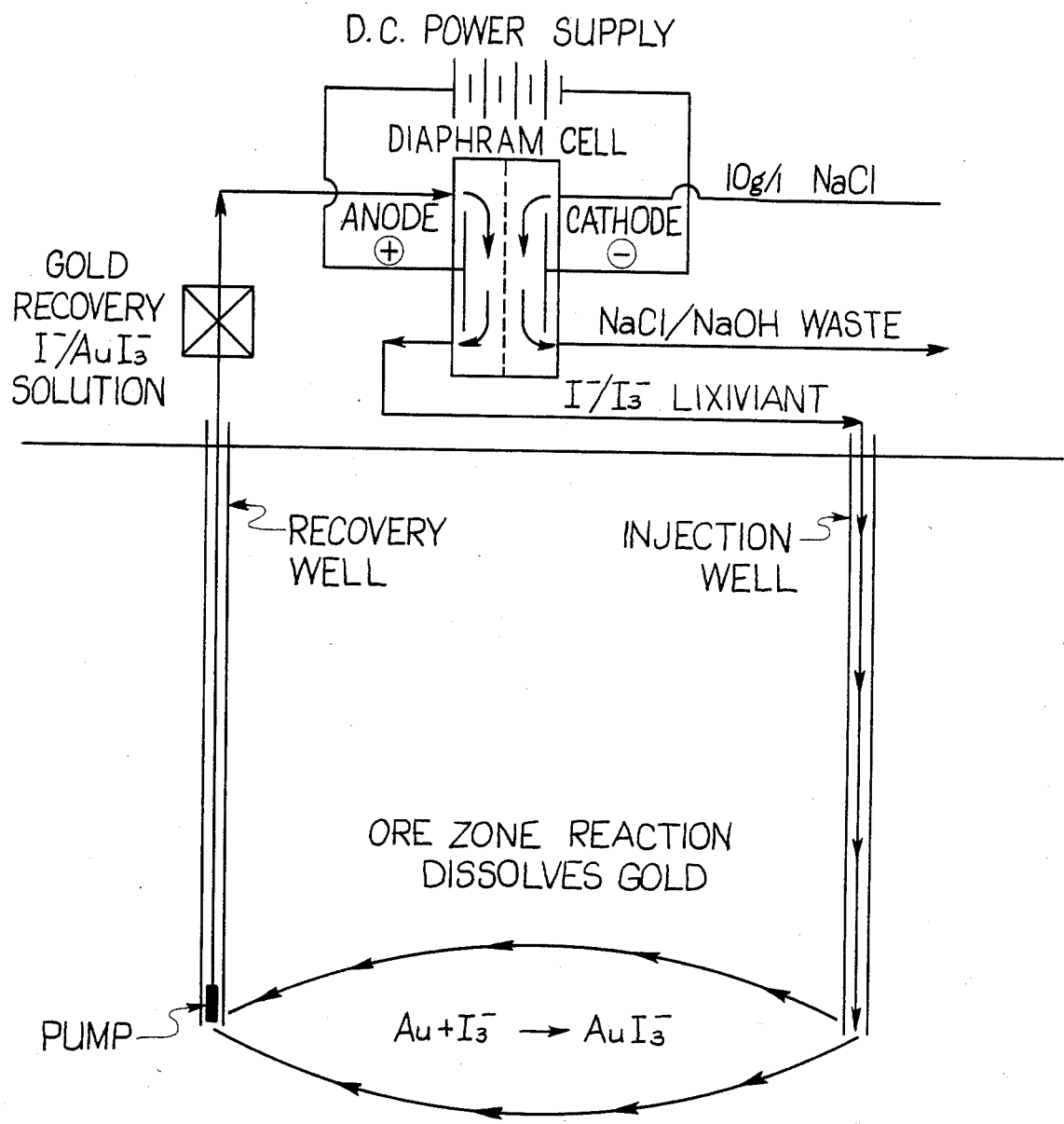
FIG. 2 depicts a diaphragm cell for oxidation of iodine.

Since reduction of the $I_3^-$ complex continues as in equations 1 and 2 during the oxidation and complexation of the gold, some means of re-oxidizing the $I^-$ is necessary in order to preserve the 2:1 ratio of reduced iodine to oxidizing iodine in the lixiviant. In the preferred embodiment, the re-oxidation of $I^-$ is accomplished electrochemically in the anode compartment of a special diaphragm cell, as illustrated in FIG. 2. Oxidation of iodide is achieved by the half cell reaction:

$$3I^- \rightarrow I_3^- + 2e^-. \qquad (6)$$

Reduction of water occurs at the cathode according to the half cell reaction:

$$2e^- + 2H_2O \rightarrow H_2 + 2OH^-. \qquad (7)$$

The net cell reaction, the sum of reactions 6 and 7, is:

$$2H_2O + 3I^- \rightarrow I_3^- + H_2 + 2OH^-. \qquad (8)$$

The diaphragm itself comprises a porous membrane separating the anode and cathode compartments of the cell. The half cells are in electrical contact, but the diaphragm prevents significant mixing of the lixiviant at the anode with the cathode solution. The means by which an appropriate cathode solution can be prepared are well known to the art, as is the general construction of the entire electrochemical cell.

In a preferred embodiment salts from the mining aquifer are used to effect the desired electrical conductivity of the anode (lixiviant) and cathode solutions. Generally, the aquifer will contain sufficient groundwater salts, such as NaCl, $NaHCO_3$, and $Na_2SO_4$ so that solutions can be prepared with final salt concentrations of between about 5 g/l and about 20 g/l, preferably between about 8 g/l and about 12 g/l, and more preferably about 10 g/l. Such concentrations are easy to obtain via reverse osmosis of intrinsic groundwater having a salt concentration of 0.5 g/l or higher. In addition other techniques well known to the art, such as electrodialysis, or ion exchange, can be used to accomplish the concentration of these salts.

The process of this invention is further illustrated as follows:

ILLUSTRATION

PHASE I—Total Iodine Build-up

Gold ore containing marcasite is loaded into transparent columns connected in series to form a total length of about 120 feet, corresponding to one pore volume, in order to simulate an ore body for in-situ leaching. During Phase I of the experiment, the total iodine concentration of the lixiviant is doubled with the cycle of each pore volume of column eluent through the simulated ore body. Initially, iodine is added to the lixiviant in a concentration of about 0.3 g/l ($I_{total}$ Table 1). Prior to the introduction of this lixiviant into the columns (pore volume 0, Table 1), all of the iodine exists in solution as "oxidized iodine" ($I_{oxid}$ Table 1). This is because none of the iodine is reduced until it contacts iodine reducing species within the ore body, such as mineral sulfides. After the lixiviant is passed through the ore body once (pore volume 1, Table 1), 0.3 g/l additional iodine is injected into and dissolved in the lixiviant (giving a total iodine concentration of 0.6 g/l); however, since all of the iodine previously injected has been reduced ($I_{red}$ Table 1), only 0.3 g/l of the iodine added to this first pore volume is present as oxidized iodine. This cyclic addition and dissolution of iodine is repeated throughout Phase I of the experiment, until four pore volumes have been passed through the columns.

It should be noted that no gold is recovered during Phase I of the experiment. This is because during Phase I an insufficient excess of oxidized iodine is present in the lixiviant, and all of the oxidized iodine is consumed before the lixiviant reaches the end of the columns. Consequently, any dissolved gold precipitates before emerging with the lixiviant. However, once the entire pore volume of the ore body contains a slight excess of oxidized iodine, the dissolved gold present in the lixiviant remains in solution, and is eluted from the final column.

TABLE 1

| Pore Volumes | Injected $I_{total}$ (g/l) | Injected $I_{oxid}$ (g/l) | Recovered $I_{red}$ (g/l) | % Au recovered |
|---|---|---|---|---|
| 0 | 0.3 | 0.3 | 0.0 | — |
| 1 | 0.6 | 0.3 | 0.3 | — |
| 2 | 1.2 | 0.6 | 0.6 | — |
| 3 | 2.0 | 0.8 | 1.2 | — |
| 4 | 3.0 | 1.0 | 2.0 | — |

EXAMPLE

PHASE II—Gold Recovery

To the transparent columns described in the above Illustration, was added a lixiviant containing 3.0 g/l total iodine. Once the gold had started to elute, the recirculation of five additional pore volumes resulted in 95% recovery of the gold recoverable by this process (% Au recovered, Table 2). Gold recovered in the process was 80% of total gold present in the ore. It should be noted that is was necessary to inject fresh iodine into the lixiviant to replace iodine recovered as reduced iodine after each pore volume passed through the ore body.

TABLE 2

| Pore Volumes | Injected $I_{total}$ (g/l) | Injected $I_{oxid}$ (g/l) | Recovered $I_{red}$ (g/l) | % Au recovered |
|---|---|---|---|---|
| 1 | 3.0 | 1.0 | 2.5 | 30 |
| 2 | 3.0 | 1.0 | 2.5 | 60 |
| 3 | 3.0 | 1.0 | 2.5 | 75 |
| 4 | 3.0 | 1.0 | 2.5 | 84 |
| 5 | 3.0 | 1.0 | 2.5 | 90 |
| 6 | 3.0 | 1.0 | 2.5 | 95 |

What is claimed is:

1. A process for the recovery of gold from a material containing gold comprising:
   (a) contacting the material with a lixiviant comprising a solution in which elemental iodine has been dissolved by means of adding iodine to the lixiviant, passing the lixiviant through ore bearing an iodine-reducing material, allowing the iodine to react with said iodine-reducing material to produce iodine, and subsequently adding more elemental iodine to this same lixiviant whereupon more iodine is dissolved by reaction with iodine, all in the substantial absence of added cations to promote dissolution of the iodine in order to oxidize elemental gold to ionic gold, and to complex the ionic gold, thus maintaining the gold in solution; and
   (b) recovering the gold from the pregnant lixiviant.

2. The process of claim 1 in which the gold-containing material is leached in-situ.

3. The process of claim 1 in which the iodine dissolution process is repeated until the total concentration of iodine in the lixiviant is between 1 and about 20 gram/liter.

4. The process of claim 1 in which the iodine-reducing material is a mineral sulfide.

5. The process of claim 4 in which the iodine-reducing species comprises marcasite.

6. The process of claim 1 in which the gold-containing material is leached by a heap leach process.

7. The process of claim 1 in which the gold-containing materials are leached by an agitated leach process.

8. The process of claim 2 in which a desirable concentration of oxidized iodine in the lixiviant is maintained by reoxidizing excess iodide in the spent lixiviant electrochemically using an electrochemical cell utilizing concentrated ground water salts from the mining aquifer to provide oxidizing anions for the process.

9. The process of claim 8 in which the electrochemical cell is comprised of an anode half cell through which the spent lixiviant is passed, and a cathode half cell through which conductive water is passed, and wherein said half cells are separated by a diaphragm comprised of a porous membrane which does not allow significant mixing of the anode and cathode solutions.

10. The process of claim 1 in which the means of recovering the gold from the pregnant lixiviant comprises contacting the lixiviant with activated charcoal.

11. In a process for maintaining the presence of gold oxidizing iodine in a lixiviant solution comprising:
   (a) dissolving elemental iodine in the lixiviant;
   (b) reoxidizing reduced iodine in the lixiviant to oxidizing iodine by means of electrochemical oxidation,
   the improvement comprising conducting the oxidation in an electrochemical cell comprised of an anode half cell through which the lixiviant-bearing reduced iodine is passed, a cathode half cell through which conductive water is passed, and a porous membrane which allows electrical contact between the half cell solutions but prevents significant mixing of said solutions, in which the cathode solution is obtained from the mining aquifer and where the electrical conductivity of said solution is increased by means of concentration of ground water salts naturally occurring in said aquifer.

12. The process of claim 11 in which the reduced iodine is formed during in-situ leaching of an ore body.

13. The process of claim 11 in which the lixiviant anode solution is initially obtained from the mining area aquifer and where the electrical conductivity of said solution is increased by means of concentration of groundwater salts naturally occurring in said aquifer.

14. The process of claim 11 where gold is recovered from the lixiviant prior to reoxidation of the iodine.

* * * * *